Aug. 24, 1965 H. N. BARR ETAL 3,202,581
LIQUID FLUIDIZED BED NUCLEAR REACTOR AND METHOD
FOR REDUCING PARTICLE ABRASION THEREIN
Filed Jan. 20, 1960 4 Sheets-Sheet 1

INVENTOR.
HAROLD N. BARR
DONALD H. PETERSON
BY
Arthur M. King
AGENT

INVENTOR.
HAROLD N. BARR
DONALD H. PETERSON
BY
Arthur M. King
AGENT

INVENTOR.
HAROLD N. BARR
DONALD H. PETERSON
BY Arthur M. King
AGENT

United States Patent Office 3,202,581
Patented Aug. 24, 1965

3,202,581
LIQUID FLUIDIZED BED NUCLEAR REACTOR AND METHOD FOR REDUCING PARTICLE ABRASION THEREIN
Harold N. Barr and Donald H. Peterson, Baltimore, Md., assignors to Martin-Marietta Corporation, a corporation of Maryland
Filed Jan. 20, 1960, Ser. No. 3,690
7 Claims. (Cl. 176—46)

This invention relates generally to liquid fluidized bed nuclear reactor, and more particularly to a method of reducing the abrasion of particles suspended in the bed of liquid fluidized bed nuclear reactors.

A liquid fluidized bed nuclear reactor comprises generally a pressure vessel within which nuclear fuel bearing particles circulate under the action of vertical upward flow of an appropriate fluidizing liquid. This liquid can serve the functions of a moderator, coolant, and/or power plant working fluid. Heat generated in the fluidized core by fission of the critical fuel mass may be removed either by transfer directly from the bed particles to the fluidizing medium (which would then act as a reactor coolant), or by transfer from the particle-fluidizing mixture to heat transfer surfaces immersed in the bed and through which a coolant travels without contact with the fluidizing medium of the bed. In the latter event, the fluidizing medium does not act as a coolant, but is circulated through the bed at the velocity required to maintain the fluidized state of the particles, that is, to maintain a desired liquid bed fraction which bed fraction is definable as the fraction of a fluidized bed which is liquid.

The particles in the bed are in constant circulation in the fluidized condition and abrade one another, which causes significant surface erosion of the particles and the production of "fines." It has been found, however, that abrasion losses can be greatly reduced by the simple expedient of introducing powdered graphite into the fluidizing liquid.

It is a purpose, then, of the present invention to provide a method of reducing abrasion losses experienced by the particles in the bed of a liquid fluidized nuclear reactor. This is accomplished by admixing powdered graphite, either natural or synthetic, with the fluidizing liquid in sufficient quantity so as to reduce the abrasion losses normally experienced by the bed particles in the fluidized condition. As will appear in more detail below, graphite additions small as 10% will reduce particle erosion by a factor of about 8, correspondingly increasing the effective life of the particles and decreasing the amount of fines produced.

In order to provide a better understanding of the present invention, reference is made to the following description of a liquid fluidized bed nuclear reactor and to the accompanying drawings, wherein.

Figure 1:
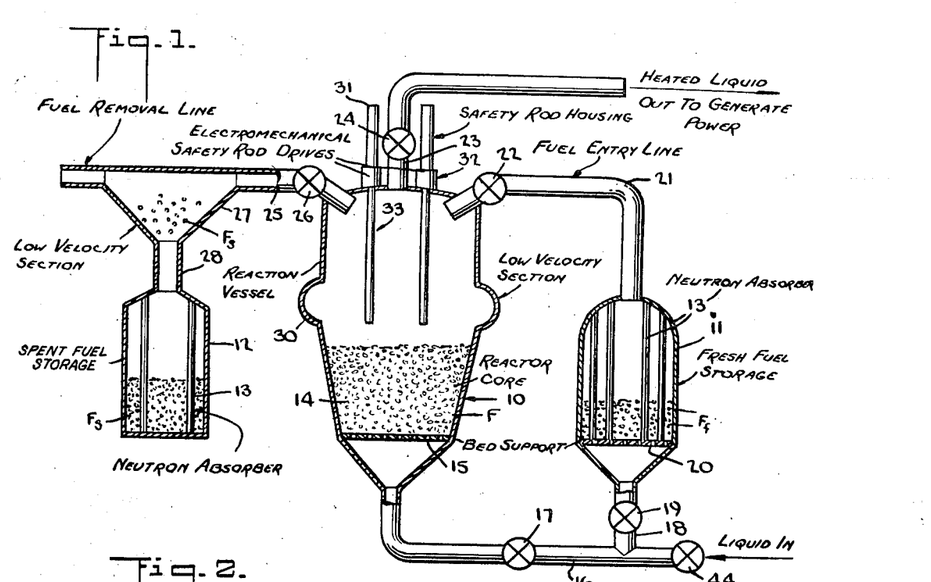
FIGURE 1 is a schematic or diagrammatic showing of a fluidized bed reactor.

Referring to the drawings and first to FIGURE 1, a water fluidized reactor is illustrated diagrammatically. This reactor includes a reactor core vessel 10 and two storage vessels 11 and 12. Fresh reactor fuel particles are intended to be stored in one of the vessels 11 and spent reactor fuel particles are intended to be stored in the other storage vessel 12. Fixed neutron absorbing rods 13 of conventional types, e.g., hafnium, boron or europium are built into these two storage vessels to preclude chain reactions occurring in either. It is understood that requisite shielding (not shown) of known types is provided for the vessels and other parts containing radioactive material.

Extending into the core vessel 10 are safety rods 33 actuated by electro-mechanical drives 32. The safety rods 33 and actuator mechanisms 32 are sealed into pressure-tight housings 31 located on the dome of core vessel 10. The actuator mechanisms 32 are designed to respond automatically to a "scram" signal from sensing devices in the reactor control circuit. During a "scram" safety rods 33 are rapidly inserted into the bed region 14 to effect shutdown. In the case of failure of the control circuit, shutdown can also be initiated manually by means of a "scram" circuit independent of the main control circuit.

The reactor core vessel 10 is tapered in its bed region 14 so that the cross-sectional area of its said bed region 14 is larger at its top than at its base. The base of the bed is defined by a bed support in the form of a porous plate 15 whose perforations are dimensioned to preclude passage of the fuel particles F but to permit vertical upward passage therethrough of water from a source conduit 16, controlled by a valve 17 to which water from a source (not shown) may be pumped as required. The conduit 16 is connected to the lower end of the vessel 10 beyond valve 17 and below plate 15.

A conduit 18 is controlled by a valve 19 and also connects the bottom of the fresh fuel storage 11 to the water conduit 16. The fresh fuel particles $F_t$ in storage vessel 11 are supported by a porous bed plate 20 of similar construction to plate 15 and having similar characteristics. The upper end of the fresh fuel storage vessel 11 is connected by a fresh fuel delivery conduit 21 controlled by a valve 22 so as to enter the upper end of the reactor core vessel 10. The upper end or dome of vessel 10 also supports a fluidizing fluid outflow conduit 33 controlled by a valve 24. In addition, a fuel removal conduit 25 controlled by a valve 26 is supported by the upper end or dome of vessel 10. Externally of vessel 10, a low velocity section 27 is provided in the conduit 25. The low velocity section 27 is connected by vertical conduit 28 to the upper end of the spent fuel storage vessel 12. The waste water conduit 29 beyond section 27 serves to lead off fuel-free water beyond the low velocity section 27.

Assuming all valves 17, 19, 22, 24 and 26 are closed, the loading of the core 14 within the reactor vessel 10 is effected by opening valves 19, 22 and 24. As a result, water from the supply source via conduit 18 is passed through the bed plate or support 20 through the fuel particles in said fresh fuel storage vessel 11 at a velocity exceeding the terminal velocity of the fuel particles $F_t$ in vessel 11. The particles, therefore, are carried from vessel 11 with the water through the conduit 21, passing open valve 22. They enter the core vessel 10 wherein they settle on the bed plate 15. Then valves 19 and 22 are closed and valve 17 opened. The fuel bed 14 consisting of the settled fuel particles F expands as a result of the upward flow of water through bed plate 15 from conduit 16 via open valve 17. The expansion is to a liquid bed fraction at which the core is critical as will be described and at which reactivity is relatively insensitive to changes in liquid bed fraction. Then the reactor is self-regulating. The flow velocity of water is then gradually increased as temperature increases until the core is operating at rated power and temperature.

The reactor shell 10 which may be cylindrical is preferably tapered slightly in its core region to improve the uniformity of fluidization of the fuel particles F constituting the reactor core bed. This taper results in larger cross-sectional area at the top than at the base of the bed. In addition, a reduced velocity section 30 is provided in the reactor shell 10. This section 30 in the embodiment shown has the form of an annular bulge in the wall of the shell located above the expected maximum bed height in fluidized state of the fuel particles F in the bed portion 14. This reduced velocity section 30 above the normal expected bed height, results in a smaller local liquid bed fraction in the zone of this reduced velocity section 30 which helps to stabilize the fluidized bed surface and to prevent particles from being carried out of the bed by the flow of fluidizing liquid and from passing out of vessel 10 via conduit 23 during operation of the reactor.

It is to be noted that fresh fuel particles $F_t$ from storage vessel 11 are readily transported to the reactor bed region 14 via conduit 21 by opening valves 19 and 22 sufficiently for the terminal velocity of the particles in vessel 11 to be exceeded.

At the end of core operating life, valves 19, 17, 22 and 24 are closed and valve 26 is opened. Then valve 17 is opened and the velocity of water entering the core area 14 via conduit 16 increases until the terminal velocity of the spent fuel particles in the core area 14 is exceeded. During this period it is assured that the reactor remains subcritical by the full insertion of all safety rods 33 into the core vessel 10. The high velocity water will then carry fuel particles from bed 14 into the spent fuel line 25 past open valve 26. On reaching the low velocity section 27 of line 25, the spent fuel particles $F_s$ will settle out at said section and drop via conduit 28 into the spent fuel storage vessel 12 whose neutron absorbers 13 prevent the mass of spent fuel particles $F_s$ from going critical or supercritical therein. The collected spent fuel particles $F_s$ may then be subjected to reprocessing steps for whatever utility such spent fuel may have.

Alternatively, the reactor may be refueled continuously. Valve 19 is left open during reactor operation. Fuel entry line 21 is made to extend into the layer of fuel particles in storage vessel 11. Valve 22 is replaced by a variable capacity pump which draws a mixture of water and fuel particles from storage vessel 11 into core-vessel 10. The water velocity in conduit 21 is maintained greater than the terminal velocity of the particles $F_t$ whereby said particles are continuously removed from storage vessel 11 and deposited into the bed in core vessel 10. Partially spent fuel is similarly removed from the bed 14 by a variable capacity pump at 26, which replaces valve 26. Again, in order to remove the fuel particles, pump 26 is operated at a certain minimum capacity sufficient to cause the particles F to be drawn into conduit 25 along with the water fluidizer. Of course, the rates at which fuel particles are respectively introduced into and removed from the bed 14 is closely controlled so that the reactor remains critical.

The reactor shown in FIGURE 1 can be designed to operate at a power output level (heat of 7.7 megawatts) ($2.64 \times 10^7$ B.t.u./hour) when clean and hot. The performance and design data of such a reactor, for example, is as follows:

(1) Fuel ___________________ 93.0% Enriched uranium (7.25 Kg. U–235).
(2) Form of fuel ___________ $UO_2$ Particles.
(3) Particle size ___________ 300 Microns.
(4) Coolant, fluidizer and moderator _______________ Light water.
(5) Power (heat) for hot, clean reactor ______________ 7.7 mw. ($2.64 \times 10^7$ B.t.u./hour).
(6) Average core temperature ______________ 600° F.
(7) Mean bed diameter ______ 60 Centimeters.
(8) Unfluidized bed height ___ 60 Centimeters.
(9) Liquid bed fraction for hot clean reactor ______________ 0.70.

(This is a function of the entrant fluid velocity and particle terminal velocity and as empirically determined is also a function of the particle Reynolds number as will be described.)

(10) Coolant temperature:
  Entering core _____________ 550° F.
  Leaving core ______________ 650° F.
(11) Coolant pressure ________ 2700 p.s.i.a.
(12) Particle terminal velocity (turbulent flow $U_t$) ________ 1.155 ft./sec.
(13) Entrant fluid velocity ____ 0.363 ft./sec.
(14) Core vessel material _____ Stainless steel acting also as a reflector.

Reactor design

The particular reactor specifications just set forth in regard to the reactor construction of FIGURE 1 and to fluidized core reactors designed to operate at different power output levels are based upon the following general and specific considerations of what is known about fluidization of solid particles and also of critical mass considerations of nuclear fuels as well as other factors including the graphs and curves of various figures shown herein.

Fluidization in general

Studies of fluidization of a bed of solid particles have led to the following observations.

Fluidization of a bed of solid particles is produced by the vertical flow of a fluid through the bed at a sufficiently high velocity. The bed is supported in the unfluidized state by a porous plate which permits the vertical passage of fluidizing fluid.

Before the flow starts, the bed is in a static state. As fluid flow begins, the bed enters a semi-liquid condition somewhat similar to that of quicksand. In this state, the pressure drop through the bed increases with velocity. Further increases in the flow rate are accompanied by corresponding increases in pressure drop. Finally a velocity is reached beyond which the pressure drop no longer continues to increase. At this "critical" velocity, the bed is in a state of incipient fluidization.

Any further increase in velocity is followed by expansion of the bed to a new equilibrium volume and circulation of particles through the region occupied by the bed commences. When this occurs, the bed acquires characteristics usually associated with a fluid and is said to be in a fluidized state. A fluidized bed is characterized by a more or less well defined surface, lack of resistance to imposed shear stresses, hydrostatic pressure, and a buoyant effect such that an object less dense than the mean bed density will float on the bed surface.

Successive increases in velocity are followed by expansion of the bed to new equilibrium volumes. If the velocity of the fluidizing liquid should exceed a certain velocity termed the "terminal velocity" ($U_t$) for the bed particles, the particles will be carried along with the fluidizing fluid, and the fluidized bed will cease to exist.

The degree of homogeneity of a bed in the fluidized state depends on particle size, the ratio of particle density to fluid density, and the fraction of the bed which is fluid. Homogeneity is promoted by the use of small particle sizes, low particle density/fluid density ratios and low fluid bed fractions (small bed expansion). Because of the large difference in the density of liquids and gases, fluidization by liquids is usually characterized by a high degree of homogeneity while gas fluidization is usually characterized by a low degree of homogeneity.

In a liquid fluidized bed complete homogeneity and a sharp, clearly defined bed surface can be retained even with relatively large bed expansions. In a gas fluidized bed, non-homogeneous conditions develop shortly after the point of incipient fluidization. Highly turbulent conditions are evident and the bed surface fluctuates over a wide range. Fluidization by gas is referred to as "aggregative" because the particles in a gas fluidized bed appear to circulate in clumps. For these and other reasons as will apear, fluidization by liquids rather than gases appears to be preferable for application of general fluidization principles to nuclear reactor design.

Pressure drop through a fluidized bed is practically constant and independent of fluid velocity. It has been found that this pressure drop is approximately equal to the net weight of the bed in the fluid per unit area. This relationship can be written as $$\Delta p = (\rho_s - \rho)(1 - \epsilon_0) L_0$$

where $\Delta p$ = bed pressure drop
$\rho$ = fluid density
$\rho_s$ = solid density (of particles)
$\epsilon_0$ = unfluidized fluid bed fraction (0.4 equals presumptively a reasonable value for randomly packed fixed beds of spherical particles)
$L_0$ = unfluidized bed height Experimental and empirical relationships have morebeen developed for fluid bed fraction, $\epsilon$ the fraction of a fluidized bed which is fluid to the ratio of $U_0$, the entrant fluid velocity (equals volumetric flow rate divided by bed cross-sectional area), and $U_t$, the particle terminal velocity (velocity which a single free falling particle would reach in the fluid).

The correlations are of the form $$\epsilon = B(U_0/U_t)^b$$

B and b are empirical constants whose value depends on whether a reference particle falling freely through the static fluidizing fluid reaches its terminal velocity under conditions of (a) laminar flow, (b) turbulent flow or (c) an intermediate form of flow. The flow regime in which the terminal velocity of the reference particle exists depend on $Re_p$, the particle Reynolds number, defined as $$Re_p = \frac{D_p U_t}{v}$$

where $D_p$ = particle diameter
$v$ = kinemtaic viscosity of fluid.

If the particle Reynolds number is less than 2, the terminal velocity will exist in the laminar flow regime for which $$U_t = \frac{g D_p^2}{18v}(\rho_s/\rho - 1) \text{ ft./sec.}$$

Then empirically $$\epsilon = 0.99 \ (U_0/U_t)^{0.118}$$

If $2 < Re_p < 500$, an intermediate flow regime will exist when the particle reaches its terminal velocity and $$Ut \approx \frac{0.153 D_p^{1.14}}{v^{0.43}}[g(\rho_s/\rho - 1)]^{0.71} \text{ ft./sec.}$$

Then empirically $$\epsilon = 1.04 \ (U_0/U_t)^{0.337}$$

If $500 < Re_p < 200{,}000$ a turbulent flow regime will exist when the reference particle reaches its terminal velocity, and $$U_t = 1.74[g D_p(\rho_s/\rho - 1)]^{0.5} \text{ ft./sec.}$$

Then empirically $$\epsilon = 1.15 \ (U_0/U_t)^{0.430}$$

Figure 2:
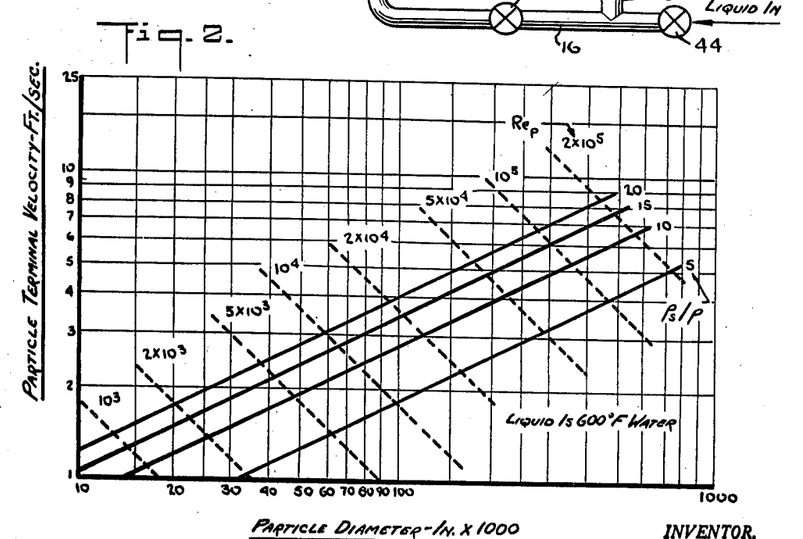
FIGURE 2 is a graph illustrating terminal velocity for free flowing particles in turbulent flow, being a plot of particle terminal velocity versus particle diameter.

Curves of particle terminal velocity in 600° F. water for the case of turbulent flow are shown in FIGURE 2 as a function of particle diameter and the ratio $\rho_s/\rho$. Curves of constant $Re_p$ also appear in this figure.

It should be noted that the determination of whether terminal velocity $U_t$ is reached under laminar, the intermediate or turbulent flow conditions is a trial and error process, since $U_t$ must be known to calculate $Re_p$, but the proper formula for $U_t$ cannot be determined until $Re_p$ is known. The utility of the curve of FIGURE 2 to reactor design will later become apparent.

*Fluidized core design considerations*

Figures 3, 4A, 4B, 4C, 4D:
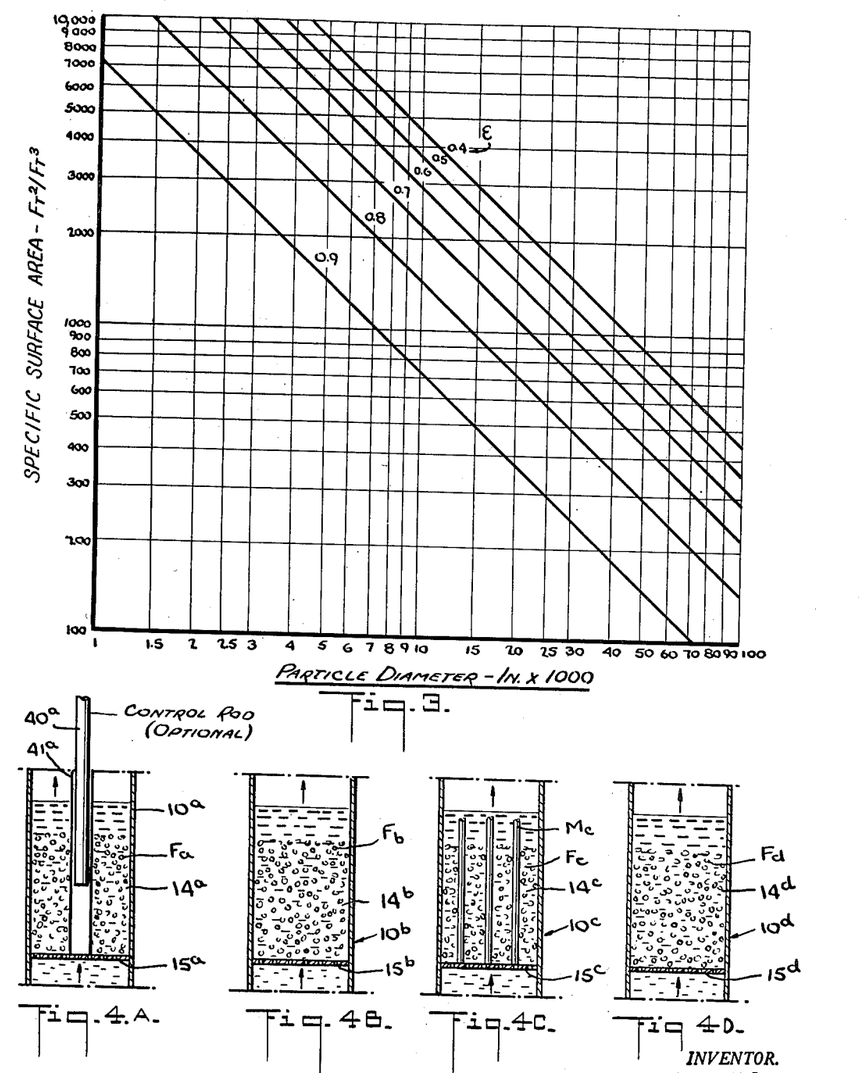
FIGURE 3 is a graph illustrating surface area per unit volume of bed versus particle diameter for several fluid bed fractions.
FIGURES 4a, 4b, 4c and 4d illustrate diagrammatically liquid fluidized core types.

There are four possible liquid fluidized core types which are shown diagrammatically and respectively in FIGURES 4a, 4b, 4c and 4d. The types of FIGURES 4a, 4b, and 4c are thermal reactors, while the type of FIGURE 4d is fast. In the first type (FIGURE 4a) the fluidizing medium flowing through the core bed 14a of fuel particles Fa in the shell 10a acts as a liquid moderator and also acts as the reactor coolant. Fluidizing liquids could include light water, heavy water, and organic fluids such as biphenyl. The fuel particles Fa in the bed 14a may consist of uranium oxide particles having the particle size mentioned above or other selected particle sizes. An operational limitation on the liquid fluidized core type of FIGURE 4a is temperature, and because of pressure or thermal stability considerations, the maximum operating temperature of liquid fluidized cores of the type of FIGURE 4a range from 600° F. to 700° F. It is to be noted that in the water fluidized reactor of FIGURE 1 (of which FIGURE 4a is the prototype) with actual design factors hereinabove specified, the average reactor core temperature is about 600° F. and particle size is 300 microns. Particles of other sizes may be used, e.g., 0.075 inch or more.

The temperature limitations of the fluidized core type of FIGURE 4a can be offset in reactor types of FIGURES 4b, 4c and 4d wherein a liquid metal such as sodium is used as the reactor coolant.

In FIGURE 4b, the particles $F_b$ of the core bed 14b in the reactor shell or housing 10b are composed of a mixture of solid moderator such as beryllium or other solid moderator material in which highly enriched fuel is dispersed. The particle sizes may be those hereinbefore specified or of other selected dimensions. A difficulty, however, of the arrangement of FIGURE 4b is that as expansion of the core bed 14b under action of the liquid metal coolant and fluidizer occurs, the moderator will occupy a smaller fraction of the bed volume and thus introduce critical mass control problems.

The difficulty noted with respect to the fluidized core arrangement of FIGURE 4b can be offset as illustrated in the arrangement of FIGURE 4c. In the latter, the core bed 14c in shell 10c comprises enriched fuel particles $F_c$, for example, uranium enriched in uranium 235, in the form of uranium oxide $UO_2$ of selected particle size, e.g., 300 microns or other particle size. Moderators in the form of solid moderator rods $M_c$ of suitable moderator material such as carbon or beryllium are located within the core bed. Thus, herein, expansion of the fluidized core bed 14c of fuel particles under action of the liquid metal coolant and fluidizer occurs in the presence of fixed spaced moderators $M_c$ which occupy a significant fraction of the core bed volume so that criticality control at any time during reactor operation is conveniently maintained.

Requirements for a moderator as a design factor are eliminated in the fluidized reactor core type of FIGURE 4d which is a fast reactor utilizing enriched uranium in the form of $UO_2$ in particles $F_d$ of 300 micron or other selected size in the core bed 14d within shell 10d and liquid metal, e.g., sodium as the reactor coolant and fluidizer.

Criticality calculations have been performed for the types of liquid fluidized cores of FIGURES 4a and 4d, it being noted that the core of FIGURE 1 is of the same type as that of FIGURE 4a, i.e., liquid acting as coolant, moderator and fluidizer.

Figure 5:
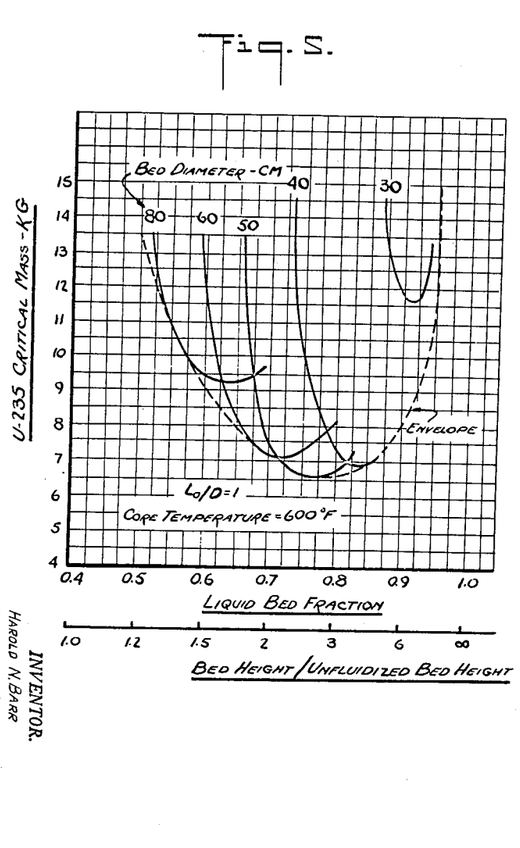
FIGURE 5 is a graph illustrating U-235 critical mass of a water fluidized reactor versus liquid bed fraction.

FIGURE 5 is a plot or graph of the critical mass of U-235 versus the liquid bed fraction at a reactor temperature of 600° F. for several different bed diameters. It is assumed that highly enriched uranium is dispersed in bed particles which are composed of a solid material whose only effect on reactivity is to dilute the moderator. For all the curves shown in this figure, the ratio of initial unfluidized bed height $L_0$ to bed diameter $D$ is one, i.e., $L_0/D=1$. It will be observed that the existence of a minimum critical mass for each bed diameter exists. Of particular significance is the rapid rise in critical mass for each of the curves as the liquid bed fraction approaches 0.4 which is approximately the value of a randomly packed bed in the unfluidized state. It thus appears that a light water fluidized core bed can be designed to be subcritical unless expanded to a specified liquid bed fraction. For example, if a 60 cm. diameter core bed 14 or 14a is loaded with approximately 7.25 kg. of U-235 in the form of uranium oxide, it will not go critical at 600° F. until expanded to a liquid bed fraction of at least 0.7. It follows that a reduction or cessation of flow of fluidizing liquid leading to collapse of the bed to a liquid bed fraction less than 0.7 will result in a subcritical system so that "fail safe" operation results. In other words, cessation of flow fluidizing liquid automatically renders the reactor core subcritical precluding runaway conditions from occurring.

"Fail Safe" operation at room temperature can similarly be assured. However, because of the increase in reactivity with a reduction in temperature usually characteristic of water moderated cores, a core with a specified fuel loading will reach criticality at a smaller liquid bed fraction at room temperature than at elevated temperature.

Upon further examination of FIGURE 5, it can be seen that if the operating point is chosen at the minimum of a critcal mass curve, the effect of varying bed height on reactivity can be minimized. Moreover, the flatter the trough of the critical mass curve, the more insensitive will reactivity be to fluidized bed height fluctuations. For example, as seen in FIGURE 5, the liquid bed fraction of the 60 cm. bed can be varied from 0.7 to 0.725 without significantly changing the critical mass. They correspond as also seen from FIGURE 5 (assuming initial unfluidized bed height at 60 cm.) to a change in bed height from 120 cm. to about 135 cm. The significance to this insensitivity is that by proper selection of operating conditions, it is possible to stabilize the water fluidized reactor with respect to reactivity even when the bed is in a highly turbulent state with a relatively widely fluctuating bed surface. Similar results occur for beds of other diameters. For example, also as seen in FIGURE 5, the liquid bed fraction of an 80 cm. bed can be varied from 0.62 to 0.66 without significantly changing the critical mass. This corresponds to a change in fluidized bed height for 128 cm. to 144 cm. (unfluidized bed height 80 cm.) thus permitting stability of operation with respect to reactivity even when the bed is in a highly turbulent state with a widely fluctuating bed surface.

Another stabilizing influence in a water fluidized reactor is the effect of temperature on the liquid bed fraction. Experimental tests indicate that a rise in temperature is followed by a decrease in bed fraction at constant volume flow resulting in a reduction of the reactivity providing the operating point is to the left of the critical mass curve of FIGURE 5. This effect will be less significant at higher temperatures, since then the reduced temperature sensitivity of kinematic viscosity and the increased temperature sensitivity of water density will combine to reduce the observed effect of temperature on the liquid bed fraction for a constant mass flow rate. When the usual negative offset on reactivity due to the temperature rise in water is also considered, a water fluidized reactor may be characterized by a rather large negative temperature coefficient.

Another significant factor can be noted in FIGURE 5. Foregoing the stability advantages of operating near the minimum point on the critical mass curve (which may be feasible if the negative temperature reactivity coefficient is large enough), then operation on the steep portion to the left of the minimum point of the curve may permit shim control of the reactor by variation of the flow rate of the fluidizing medium. For example, if a 60 cm. bed is just critical with a fuel loading of 11 kg., criticality of the reactor could be maintained during the burnup of one kg. (9% burnup) by raising the fluidizing liquid flow velocity so that the liquid bed fraction increased from 0.61 to 0.62. This changed liquid bed fraction would only require a small velocity increase of the order of about 4%. Thus, by selection of operation of the reactor on the steep portion to the left of its particular critical mass curve, a novel and simple method for shim control can be provided merely by regulation of water flow rate. This regulation, however, has limitations because an increase of flow rate at constant reactor power will tend to reduce cycle efficiency and output of a nuclear power plant.

The curves of FIGURE 5 have been plotted for a ratio of unfluidized bed height to bed diameter of unity, i.e. $L_0/D=1$. The effect of varying this ratio on critical mass can also be computed for differently diametered beds. Such computation and plots (not shown) indicate that the general shapes of the critical mass curves are little affected by varying the $L_0/D$ ratio. Although this is true, the indications are that considerable saving in critical mass would be possible by reducing the $L_0/D$ ratio below one. However, the operating point for such reactors will then tend to move toward higher liquid bed fractions where bed inhomogeneity may become more pronounced. Under present circumstances, it appears preferable to provide a reactor with an $L_0/D$ ratio of 1 as is noted in the specific water fluidized reactor specifications set forth hereinabove wherein $L_0$ and $D$ each are 60 cm.

Figure 6:
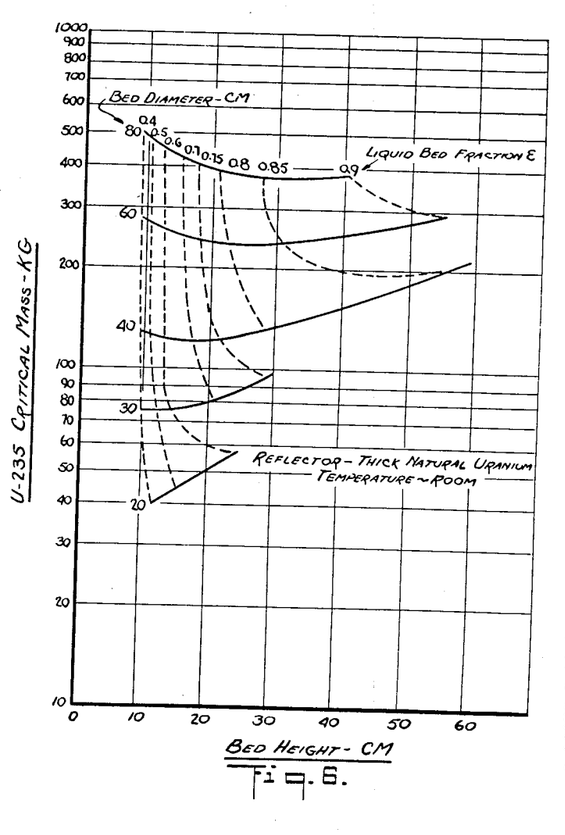
FIGURE 6 is a graph illustrating U-235 critical mass for a fast fluidized reactor versus bed height.

The liquid fluidized core of FIGURE 4d for which criticality calculations have been performed is based upon the assumption that it is a fast, cylindrical U-235 reactor surrounded by an infinite natural uranium reflector (now shown). The core particles $F_d$ are uranium in the form of metallic pellets and the fluidizing liquid is, for example, liquid sodium or other nuclearly inert liquid producing no major effect on reactivity other than to dilute the uranium. The results of such calculations are shown in FIGURE 6. In making these calculations for beds of different diameters, use was made of an empirically determined fact that the critical mass of a fast U-235 reactor surrounded by a thick natural uranium reflector is an inverse function of the core density to the 1.2 power, and then equating the buckling of an equivalent bare sphere to an equivalent bare cylinder. For calculational purposes, the reflector savings of the reflected cores were assumed negligible.

Since the empirical data on which the critical mass calculations were based was presumably obtained at room temperature, the calculations also apply at room temperature. The results of the calculations are plotted in FIGURE 6, the critical mass being plotted against bad height for various diameters. Curves of constant liquid bed fraction are shown as dotted lines.

It will be observed from FIGURE 6 that the critical mass goes through a minimum for cores having a diameter larger than 30 cm. Moreover, if similiar calculations are made considering reflector savings other than core, the minimum becomes apparent only with cores of considerably larger diameters. Thus, the important "fail safe" characteristics so clearly present when a thermal liquid fluidized reactor of the type of FIGURES 1 and 4a collapses to the unfluidized state may not be present in fast reactors unless large diameter cores (with consequent high fuel loadings) are used. It is apparent, however, that a fast reactor may have good reactivity stability with respect to fluctuations in bed height or the liquid bed fraction. For example, with reference to FIGURE 6, the critical mass of a 40 cm. diametered bed is virtually constant between a liquid bed fraction of 0.6 and 0.7 which corresponds to a bed height variation between 13 and 17 cm. It is further observable from FIGURE 6 that for liquid bed fractions up to 0.8 the height of most cores is appreciably less than the core diameter.

The analysis and curves of FIGURES 5 and 6 indicate that both liquid fluidized reactors (FIGURES 1 and 4a) and fast liquid metal fluidized reactors (FIGURE 6) are feasible, preference presently being for a water (fluidized) reactor of the types represented in FIGURE 1 which has excellent "fail safe" characteristics upon collapse to unfluidized state, whereas fast fluidized reactors require more careful bed dimension considerations to insure "fail safe" characteristics and consequent higher fuel loadings which may render their use uneconomical.

While reactors of the types of FIGURES 4b and 4c also appear feasible, difficulties mentioned hereinabove as to them render it preferable in the present state of the art to utilize the liquid fluidized reactor type of FIGURE 4a, or fast reactors of the type of FIGURE 4d.

Nevertheless, it is evident that the fluidized bed type of reactor possesses inherent versatility and simplicity. Although, only reactors using highly enriched fuel have been considered, many factors entering into the choice of reactor type determine the ultimate design. The possibility of extending the fluidized bed reactor concept to low-enrichment cores should not be overlooked. It appears from preliminary studies that such a reactor will prove feasible. In view of the relatively low flow velocities allowable, large diameter liquidized beds would be required. However, because of the high fuel to liquid ratio, fast reactors of this type might well realize a significant degree of conversion of U-238.

Heat removal

Heat removal from the fluidized core reactors of any of the types hereinbefore mentioned for generating power may be accomplished in at least three ways, (1) by utilizing the fluidizing medium in addition as the coolant. This is the arrangement illustrated in FIGURE 1. Therein the fluidizing liquid in its transit through the critically reacting fluidized nuclear core 14 has heat transferred to it directly at very high rate per unit core volume. Very conservative calculations show that volumes on the order of several thousand kilowatts per cubic foot should be possible with film drops considerably less than 50° F. The use of the liquid for both fluidization and as reactor coolant is, therefore, indicated as the preferred combination.

However, such a combination requires that the velocity of the reactor coolant entering the core vessel be equal to the velocity required to expand the core to a specified liquid bed fraction. The fluidizing velocity cannot exceed, however, and for reasonable bed expansions will be appreciably less than the terminal velocity which is characteristic of the bed particles in the fluidizing liquid. The highest feasible terminal velocities reached under turbulent flow conditions are relatively low. In FIGURE 2 the terminal velocity for turbulent flow is plotted against particle diameter for various ratios of solid particle density to fluid density $\rho_s/\rho$ where:

$\rho_s$=density of bed particles
$\rho$=density of fluid

The curves of FIGURE 2 are drawn specifically for 600° F. water, they are also applicable for fluids with the same density and kinematic viscosity.

With the aid of this FIGURE 2, approximations of the maximum flow velocity satisfying fluidization requirements can be obtained. Assuming a maximum particle diameter of 0.1 in. and a density ratio $\rho_s/\rho$=20, the terminal velocity of the particles from FIGURE 2 is 4 ft. per second. Further assuming a liquid bed fraction $\epsilon$ of 0.7, and the empirical equation for liquid bed fraction for turbulent terminal velocity $$\epsilon = 1.15 \ (U_0/U_t)^{0.430}$$

where $U_0$=entering velocity
$U_t$=turbulent terminal velocity then from the latter equation $U_0$ the entering velocity is calculable as 32% of the terminal velocity ($U_t$ of 4 ft./sec.) being about 1.3 ft./sec. This entrant velocity, it should be emphasized, is the value at the entrance to the core, i.e. as it enters the core just below the perforated bed plate 15 which is appreciably less than the fluidizing liquid velocity in the core. The entering velocity will differ for differently diametered particles and density ratios.

For example, if the particle diameter is 300 microns as in the example of particular reactor design hereinabove set forth and the density ratio is 10, the entering water velocity $U_0$ will be about 0.363 ft./sec. and the turbulent terminal flow velocity $U_t$ about 1.155 ft./sec.

Figure 7:
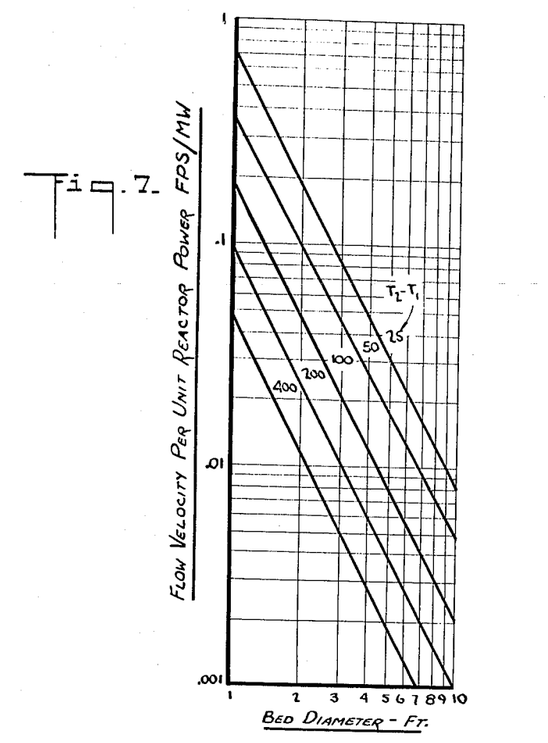
FIGURE 7 is a graph illustrating heat transfer requirements for an internally water cooled bed, being a plot of flow velocity per unit reactor powder versus bed diameter.

The rate at which heat can be removed from a reactor is a function of fluid density entrant velocity, core diameter, entering and leaving temperatures of the coolant and the specific heat of said coolant. The entrant flow velocity $U_0$ of the coolant is relationship to the rate of heat removal Q, i.e. $U_0/Q$, the flow velocity per unit reactor power is plotted against bed diameter in FIGURE 7 for a water cooled and fluidized bed for which $$\rho C \approx 62.4 \ \text{B.t.u./ft.}^3 - ° \ F.$$

where $C$=specific heat coolant

From FIGURE 7, the water flow velocity needed to meet reactor design and cooling requirements can be determined as illustrated by the following example.

A coolant temperature rise across the reactor at 50° F. and a reactor power level of 10 mw. will be assumed. If a core diameter of approximately two feet is desired, FIGURE 7 shows that a flow velocity of 0.1 ft./sec. per mw. is required, or 1 ft./sec. for a 10 mw. output.

This velocity is less than the maximum achievable from the fluidization viewpoint if a bed with 0.7 bed fraction and 0.1 inch particles are used. However, as this velocity is approached only by the simultaneous use of a large particle diameter and a large particle-fluid density ratio, both of which increase the tendency toward bed inhomogeneity and possible nuclear instability, the feasibility of the 1 ft./sec. water velocity may be questionable. If a 1 ft./sec. velocity were found to be intolerable from the nuclear viewpoint or unachievable practically, then the reactor might require larger bed diameter and/or collant temperature rise.

In the reactor of FIGURE 1 with specific design factors as hereinabove described with a bed diameter of 60 cm., the coolant temperature rise is seen to be 100° F. and entrant velocity of the fluidizing water is but 0.363 ft./sec. well within satisfactory operational ranges and bed diameter dimesions.

Another possible way of cooling the reactor is to introduce a separate reactor coolant other than the fluidizing medium. This separate coolant as is conventional can circulate through a closed circuit of pipes entering the core region of the reactor and this coolant can be used directly as the working fluid for generating power or in an externally located heat transfer arrangement with such working fluid.

Advantages of separating the coolant fluid from the fluidizing liquid are that maximum flow velocity of the coolant for heat removal is not limited by fluidizing requirements as is the case when the coolant also acts as the fluidizing liquid as illustrated in FIGURE 1. These advantages, however, are off set by increased complexity of the reactor system including the necessity for introducing a large number coolant tube surfaces into the core area of the reactor. In addition, currently available equations for calculating heat transfer coefficient for liquid fluidized beds are too approximate to provide exactitude and necessary safe certainty. For example, as a rough estimate for a 10 mw. reactor with a bed diameter of 2 ft. and bed height unfluidized of 4 ft. with bed fraction of 0.7 and a density ration of 10, it can be shown by computation that approximately 300 tubes ½ inch diameter and 4 ft. long would be required in the 2 ft. diametered core occupying about 13% of the core volume. The calculations used to arrive at these figures are based upon conventional heat transfer coefficient formulae for an air fluidized bed. Its applicability to liquid fluidized beds is only an educated guess. Thus, while external reactor coolants appear to be feasible and under some circumstances more desirable, the preferred arrangement at present as shown in FIGURES 1 and 4a is utilization of the fluidizing liquid also as the coolant.

*Thermal stress*

Another factor requiring consideration in reactor design with fluidized beds is restriction on bed particle size by allowable thermal stress of the material which comprises the bed particles. Rough calculations of the order of magnitude limitation on particle size due to thermal stress can be made based upon known formulae for maximum thermal stress in a sphere of particular materials and other physical properties. These calculations even with an assumption of thermal stress as high as 10,000 p.s.i. result in a particle of 0.43 inch diameter. Since the calculation is based upon conservative assumptions as to the known physical constants of the material from which the bed particles of the fuel are to be constituted it appears that thermal stress is probably not a limitation on particle size.

*Pumping power*

The pumping power required to pump a fluidizing liquid through a fluidized reactor core can be determined by utilizing the formula:

$$P = \frac{\Delta p A U_0}{\eta p}$$

where $P$ = bed pumping power
$\eta p$ = pumping efficiency
$A$ = cross-sectional area of bed
$\Delta p$ = bed pressure drop = $(\rho_s - \rho)(1 - \epsilon_0)L_0$
$U_0$ = entrant fluid velocity
$\rho_s$ = density of bed particles
$\rho$ = density of fluidizing medium $\epsilon_0$ = fluid bed fraction of unfluidized bed, in this case about 0.4
$L_0$ = height of unfluidized bed
$V_0$ = volume of unfluidized bed Inserting the value of $\Delta p$ in the above equation for P $$P = (\rho_s - \rho)(1 - \epsilon_0)\frac{U_0 V_0}{p}$$

With this formula it can be shown that the water pumping power even for a specific density of the bed particle of 20 and an entrant flow velocity of 1 ft./sec. for illustrative purposes that water pumping power per unit unfluidized bed volume is 1.8 kw./ft.³. Thus, if a water fluidized reactor core has an unfluidized bed volume of 10 ft.³ and the pump efficiency is 90%, the total pumping power at room temperature will be 20 kw., a relatively small figure. To this estimate of course pressure losses at bed inlet, outlet and supporting plate must be added by known engineering procedure to the calculated value for the bed proper. In all event, the pumping power to fluidize the bed core provides to be a relatively small figure to total power output derivable.

*Reactor control*

As indicated in the discussion of criticality, the operation of both thermal (water) and fast fluidized reactors may be relatively stable and self-regulating provided a flat region on the critical mass curves of FIGURES 5 and 6 are selected for the operational points. Should complete self regulation not prove possible, a conventional regulating rod 40a or rods can be placed inside a thimble 41a (see FIGURE 4a) protruding into the core bed 14a. A similar rod or rods can be positioned in the core beds of FIGURES 1 and 4d.

The presence of such neutron absorber rods will have little effect on heat transfer or fuel burnup characteristics because of the homogenizing effect of bed particle circulation in fluidized state.

Shim control can be accomplished in several different ways. Conventional absorbing rods in the core or movement of the reflector can be used. In the case of liquid fluidized reactors of the types of FIGURES 1 and 4a, a decrease in reactivity with time can be compensated for by an increase in the liquid bed fraction if the operating point is located to the left of the minimum critical mass curves shown in FIGURE 5. Change in liquid bed fraction can be effected, for example, by change in velocity of the fluidizing liquid.

As already noted, this method of shim control would tend to reduce cycle efficiency and output at constant power.

Another possibility is to add fresh fuel particles to the core continuously or at appropriate intervals. This in the apparatus of FIGURE 1 is feasible by appropriate operation of valves 19 and 22. It can be shown that this shim control procedure may be relatively uneconomic since theoretical results indicate that fuel must be added at a greater rate than it is consumed in order to maintain criticality.

The continuous addition of fresh fuel and concurrent removal of partially spent fuel has also been considered as a method of control. For example, effectively one new core would be added each core lifetime. Compared to the flow rates and pumping power required for maintaining fluidization, the flow rate and pumping power for continuous refueling is small. A decided advantage of this control process lies in the possibility of continual reactor operation for the life of the reactor. Partially spent fuel would be processed either in small batches or continuously in a plant close by the reactor. Since relatively small amounts of "hot" wastes would be handled, the requisite plant need not be large. Reclaimed fuel would then be fabricated at the reactor site and returned to the reactor storage vessel for eventual use.

Safety control in the form of scram rods or reflector movement may be provided for any of the fluidized cores described being operable in the same general manner as conventional controls of this kind which are operated in existing reactors.

For liquid fluidized cores of the type of FIGURES 1 and 4a, the following safety or scram control is much simpler. It is simply necessary to provide a quick closing valve 44 (FIGURE 1) in the water line 16. This valve may be solenoid type requiring electric power to maintain it in open condition and being movable automatically to cut off condition on occurrence either of electric power failure or a scram condition signal. Automatic quick shut off of valve 44 will shut off flow of fluidizing water to the reactor core causing the fluidized bed to collapse and the reactor to go subcritical, i.e., to "fail safe" as hereinabove described with reference to FIGURE 5. For this type of scram system, a method would have to be provided for adequate cooling of the subcritical core following the scram.

In the reactor of FIGURE 1, the bulge or low velocity section 30 in the vessel 10 inhibits turbulence should the core bed 14 expand excessively under an increased flow rate of fluidizing water. In this expanded section 30, the water velocity drops relative to its velocity in the core proper thus maintaining bed integrity during a transient increase in flow rate. The low velocity section also prevents particles with smaller than average density and/or diameter, which have smaller terminal velocities, from being carried out of the bed by the fluidizing liquid.

Figure 8:
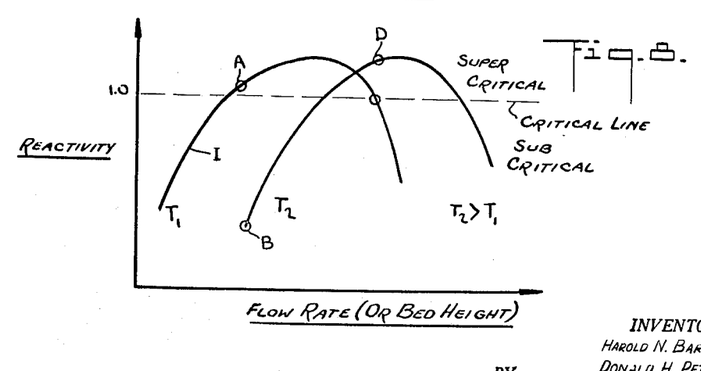
FIGURE 8 is a graph illustrating reactivity versus flow rate or bed height at different temperatures.

Note from FIGURE 5 that a critical mass at a bed fraction of 0.75 is smaller than the amount of $UO_2$ which constitutes a critical mass at unfluidized bed when the bed fraction is 0.4. It is so because moderation of neutrons is necessary to go critical. The same phenomena is also observable in FIGURE 8 which is a plot of reactivity at two different temperatures versus flow rate or bed height for a constant mass of $UO_2$. Curve I shows reactivity in relationship to flow rate at a temperature $T_1$. Curve II shows reactivity of the same $UO_2$ mass at a higher temperature $T_2$.

Because the reactivity curve is displaced to the right for increasing temperature, if the reactor is adjusted for operation critically at point A at a temperature $T_1$ and the temperature should increase at constant bed height to $T_2$, the reactor will automatically become subcritical, reactivity falling to point B of curve II well below the level 1.0 of critical operation. However, if instead the reactor is set to operate at point C in the region of decreasing activity of curve I at temperature $T_1$, a temperature rise at constant bed height to $T_2$ will automatically send the reactor up to supercritical point D of curve II, an undesirable condition. For this reason and also to provide for xenon buildup and to protect against flow loss, it is desirable as has hereinbefore been indicated to operate on the side of increasing reactivity, i.e. on the left portions of the curves of FIGURES 5 and 8 to insure "fail safe" conditions.

*Particle erosion*

Since solid particles in a fluidized bed circulate in close proximity to each other within a fixed region, the extent of wear or erosion of the bed particles and its effect on reactor operation have been considered.

It has been found that maximum allowable burnup rather than particle abrasion losses is the limiting factor in effective particle life. Experimental data indicate that attrition due to particle contact in a water fluidized bed does not occur at a serious rate. The bed particles will, of course, experience a certain reduction in a diameter, which would mean that for the same flow velocity, the liquid bed fraction would be increased. This may be compensated for by reducing flow velocity. However, since the size of the particles changes as the cube root of the mass of the particles, relatively large weight losses can be tolerated before it becomes necessary to adjust flow velocity. In practice, the size of the particles in the bed will be maintained at a predetermined average value by periodic partial refueling of the core.

The "fines" produced by particle attrition must be periodically removed from the reactor, since they cause erosion, and contaminate the primary loop. Normally, the fines would be removed during refueling, the amount of fuel: liquid mixture removed from the reactor during refueling being dependent upon the concentration of fines.

According to the present invention graphite is added to the liquid fluidizer to reduce the amount of fines produced during reactor operation. As a result erosion and contamination of the reactor liquid-carrying equipment is greatly reduced, and the amount of fuel: liquid mixture which must be removed from the reactor during refueling in order to diminish the concentration of fines in the liquid fluidizer is correspondingly reduced.

This graphite addition is beneficial, since carbon acts as a neutron moderator. Of course, only highest purity graphite may be used so as to avoid introducing nuclear poisons into the reactor. Both natural and synthetic graphite have been bound satisfactory for this purpose, although natural graphite has given better protection against abrasion of the particles.

It has been observed that, generally speaking, abrasion losses experienced by the fuel particles decrease with decreasing size of the graphite particles in the fluidizing liquid, and decreases also as the concentration of the graphite particles in the fluidizing liquid increases.

The graphite is preferably dispersed in the fluidizing liquid so as to form a homogeneous mixture therewith. For a particular flow velocity of the fluidizer the maximum graphite particle size is less than that required to maintain the graphite particles in a fluidized condition. Best results are obtained when the graphite particles size is considerably below this maximum value. In practice the average graphite particle size is made as small as is practically possible, for example, about 400 mesh, although smaller particles may be used. Experiments performed with "as received" commercial powdered graphite and commercial graphite which had been pulverized, showed that particle sizes from about 100 to 400 mesh will give satisfactory results.

The types of graphite which have been investigated for use in the practice of the present invention are generally classified into two groups, viz., natural graphite and synthetic graphite. By natural graphite is meant graphite found as such in nature, whereas artificial graphite consists of all other types of graphite. Of the two types, natural graphite has tended to give better results in reducing abrasion of fluidized particles, although "as received" Mexican Grade Graphite obtained from the United States Graphite Company, Saginaw, Michigan, did not prove satisfactory. The fact that this type of graphite is amorphous may have accounted for the poor results obtained. Natural graphites which were found to work successfully include Ceylon Type No. 8485 and No. 1110 (Joseph Dixon, Crucible Company, Jersey City 3, New Jersey), Madagascar Type No. 200–35 (Joseph Dixon Crucible Company, Jersey City 3, New Jersey) and Super Flake No. 455, No. 399, No. 193, No. 238, No. 109, and No. 287 (Superior Graphite Company, Chicago, Illinois). Examples of suitable artificial graphites are AUC and AGOT graphites (National Carbon Company, 300 E. 42nd St., New York City). The AUC and AGOT graphites were obtained in the form of blocks and rods, which were pulverized and sifted to separate various sieve fractions.

The effect of graphite particle size on abrasion losses experienced by uranium dioxide fuel pellets is indicated by the following data which were obtained for different sieve fractions of pulverized AUC graphite. The $UO_2$ pellets were in the shape of small cylinders having rounded edges, 0.250 inch in diameter and 0.250 inch high, 93.8% of theoretical density, and were suspended in deionized water containing 10% solids concentration of graphite. In a control experiment no graphite addition was made to the water, and the percent weight loss per hour for the $UO_2$ fuel pellets was 0.1230.

| Sieve Fraction | Percent weight loss per hour |
|---|---|
| −100+170 | 0.0508 |
| −170+200 | 0.0635 |
| −200+270 | 0.0630 |
| −270+400 | 0.0163 |
| −270+400 | 0.0203 |
| thru −400 | 0.0150 |

The concentration of graphite in the liquid fluidizer may be varied over a wide range depending upon the operating parameters of the reactor. Among the determining factors to be considered are abrasion weight loss normally suffered by the fuel particles, desired nuclear properties of the fluidizer, viscosity and thermal conductivity. Accordingly, graphite concentrations ranging from about 1% upwards are contemplated. Preferably the graphite constitutes about 5% to 20% by weight of the liquid fluidizer. It is to be understood, that the method for reducing particle abrasion in a mixture of a liquid as described herein is not restricted merely to those materials as described by way of example, but is applicable to materials related with analogous problems of abrasion control in liquid suspended particles.

The present method is, of course, generally applicable to liquid fluidized bed nuclear reactors in which the fluidizer used is other than water, for example, a liquid polyphenyl such as diphenyl or terphenyl, or a mixture of liquid polyphenyls.

What is claimed is:

1. A method of reducing the abrasion of fluidized particles in a liquid fluidized bed of a nuclear reactor, comprising the step of admixing particles of graphite with the fluidizing liquid and particles of said fluidized bed, the average particle size of said graphite particles being such that they have a terminal velocity in said fluidizing liquid which is less than the velocity of said fluidizing liquid, and said graphite particles constituting about 5% to 20% by weight of said fluidizing liquid.

2. The method of claim 1 wherein the average particle size of said graphite is about 100 to 400 mesh.

3. A method of reducing the abrasion of fluidized fuel particles of $UO_2$ in a water fluidized bed nuclear reactor of the type described, said method comprising the step of admixing particles of graphite with the water fluidizer of said water fluidized bed in an amount of about 5% to 20% by weight of said fluidizer, the average particle size of said graphite particles being such that they have a terminal velocity in said water fluidizer less than flow velocity of said water fluidizer.

4. The method of claim 3 wherein the average particle size of said graphite is about 100 to 400 mesh.

5. In a nuclear reactor having a liquid fluidized bed in which fuel particles are suspended in a liquid, the combination therewith of graphite particles in an amount of about 5% to 20% by weight of said liquid, and having an average size of about 100 to 400 mesh.

6. In a nuclear reactor having a liquid fluidized bed in which fuel particles are suspended in a liquid, the combination therewith of graphite particles in an amount of about five to twenty percent by weight of said liquid, and having an average size such that their terminal velocity in said liquid is less than the velocity of said liquid.

7. A method for reducing abrasion between solid first particles suspended in a liquid so as to normally and continually collide with one another by the upward flow of said liquid at a velocity less than the terminal velocity of said solid first particles comprising the step of admixing particles of graphite with said liquid in an amount of about five percent to twenty percent by weight of said liquid and the average size of said graphite particles being such that the velocity of said upward flow of said liquid exceeds the terminal velocity of said graphite particles.

References Cited by the Examiner

FOREIGN PATENTS 749,064   5/56   Great Britain.
756,014   8/56   Great Britain.

OTHER REFERENCES

Atomic Energy Commission Document AECD–3647, The Reactor Handbook, vol. 3, Materials, February 1955, pages 133–137.

"Dag Colloidal Graphite for Industrial Lubricants," published by Acheson Colloids Corp., Bulletin No. 424, 1949.

CARL D. QUARFORTH, *Primary Examiner.*

ROGER L. CAMPBELL, LEON D. ROSDOL, REUBEN EPSTEIN, *Examiners.*